(12) United States Patent
Barnett

(10) Patent No.: US 6,193,253 B1
(45) Date of Patent: Feb. 27, 2001

(54) MANUAL OPERATING ASSEMBLY FOR A VEHICLE

(76) Inventor: Robert V. Barnett, 915 Oak Park Dr., Choctaw, OK (US) 73020

( * ) Notice: Subject to any disclaimer, the term of this patent is extended or adjusted under 35 U.S.C. 154(b) by 0 days.

(21) Appl. No.: 09/377,325

(22) Filed: Aug. 18, 1999

(51) Int. Cl.[7] .................................................. B62M 1/12
(52) U.S. Cl. ........................... 280/234; 280/250; 280/282
(58) Field of Search .................................... 280/230, 233, 280/234, 242.1, 249, 250, 259, 260, 261, 263, 282, 270; 440/26, 27, 28, 29, 30, 31; 74/545

(56) References Cited

U.S. PATENT DOCUMENTS

| | | | |
|---|---|---|---|
| 651,941 | * 6/1900 | Von Wedel | ........................ 280/242.1 |
| 4,417,742 | * 11/1983 | Intengan | ................................ 280/234 |
| 4,798,395 | 1/1989 | Shaffer et al. . | |
| 4,858,942 | 8/1989 | Rodriguez . | |
| 4,925,200 | 5/1990 | Jones . | |
| 5,002,298 | 3/1991 | Motto . | |
| 5,209,506 | 5/1993 | Klopfenstein . | |
| 5,242,179 | 9/1993 | Beddome et al. . | |
| 5,257,553 | 11/1993 | Cheng . | |
| 5,372,374 | 12/1994 | Hudson . | |
| 5,383,676 | 1/1995 | Valentino . | |
| 5,431,614 | 7/1995 | Jeranson . | |
| 5,490,686 | 2/1996 | Clouse . | |
| 5,492,349 | 2/1996 | Ferez . | |
| 5,511,810 | 4/1996 | Tong . | |
| 5,542,689 | 8/1996 | Chalfant . | |
| 5,700,228 | 12/1997 | James . | |
| 5,762,350 | * 6/1998 | Jolly | ..................................... 280/245 |
| 5,775,708 | 7/1998 | Heath . | |
| 5,785,336 | 7/1998 | Jang . | |
| 5,816,598 | 10/1998 | Dodakian . | |
| 5,820,151 | 10/1998 | Cheng et al. . | |
| 5,829,772 | 11/1998 | Jones . | |
| 5,833,256 | 11/1998 | Gilmore . | |
| 5,853,184 | * 12/1998 | Lofgren et al. | ................... 280/242.1 |
| 5,908,199 | 6/1999 | Rigato . | |

OTHER PUBLICATIONS

Trailmate "Fun Cycle! Series" brochure (Sarasota, Florida; Jan., 1999).
Sunrise Medical Healthcare Group "Shadow Sports and Recreational Products" brochure (Longmont, Colorado; Dec., 1997).
Trialtir International "Evolution Dual–Action Bike" (published prior to the Aug. 1, 1999).

* cited by examiner

*Primary Examiner*—Kevin Hurley
(74) *Attorney, Agent, or Firm*—Mary M. Lee

(57) ABSTRACT

A hand-operable operating assembly for a vehicle, such as a three-wheeled cycle. The drive mechanism comprises opposing members, such as oppositely oriented crank handles. A sprocket and chain assembly connects the hand crank to the pedal crank on the cycle. A grip is attached to each crank handle. The grip is pivotally attached to the crank handle and is also connected to a cable system that steers the front guidance wheel on the cycle. Thus, the front wheel is turned by simply pivoting one or both of the grips. To keep the grips properly oriented for the operator rearward of the crank handles, the crank handles are rotatably attached to the crank rods. A timing belt is provided on each crank handle to maintain the correct orientation of the handle as it orbits the crankshaft. Thus, the cycle can be steered and driven simultaneously by operation of the grips. Moreover, the grips are positioned so that they pivot about their central transverse axes. This means that the operator can turn the vehicle by a simple twist of the wrists while continuing to drive the vehicle by turning the crank handles, which are attached to the grips.

51 Claims, 4 Drawing Sheets

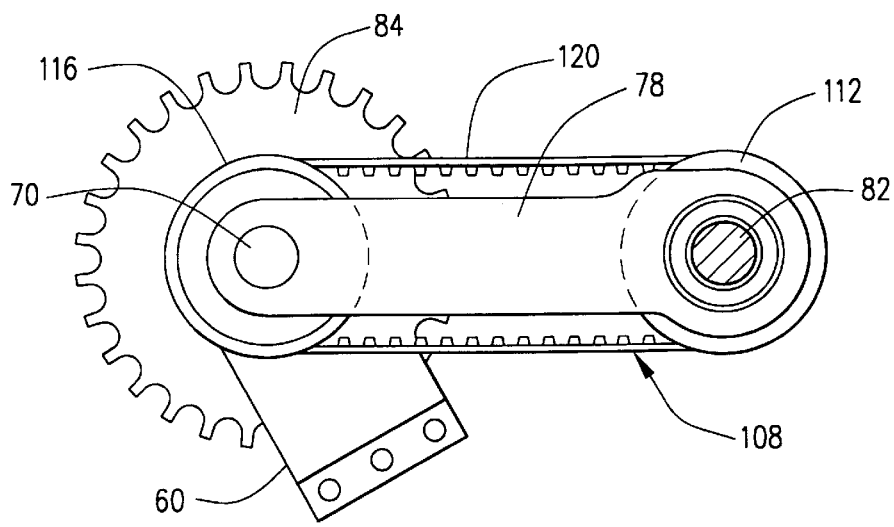
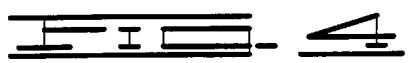
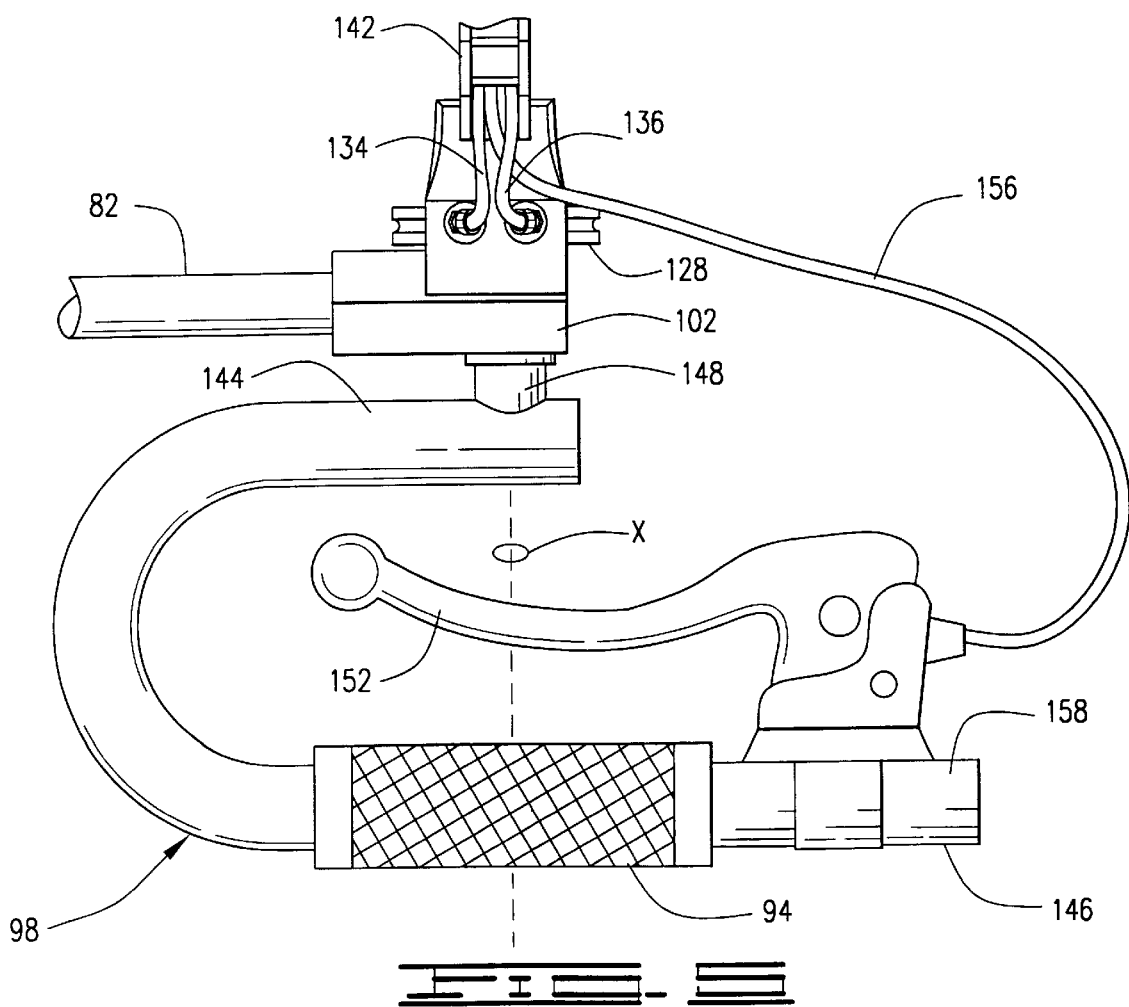
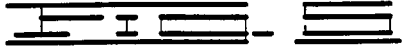

MANUAL OPERATING ASSEMBLY FOR A VEHICLE

FIELD OF THE INVENTION

The present invention relates generally to operating assemblies for vehicles, more specifically, to such mechanisms which are hand-operable and which combine the steering and driving functions.

BACKGROUND OF THE INVENTION

Bicycle riding is a popular pastime largely because of the fun and physical exercise it provides. However, those seeking a full body workout often are disappointed in the minimal upper body exercise afforded by riding conventional bicycles. Moreover, many people have weak or dysfunctional lower limbs and require a cycle that can be manually operated. Cycles have been developed with hand-operated drive systems. However, there remains a need for a manual operating system that conveniently combines the steering and the driving functions. There is also a need for a steering system that is operable by minimal wrist movement. Still further, there is a need for an operating system that uses opposing force to provide a stable sitting position for the operator while driving the vehicle.

SUMMARY OF THE INVENTION

The present invention comprises a manual operating assembly for a vehicle having a propeller and a steering mechanism. The manual operating assembly comprises a crankshaft rotatably supportable on the vehicle and operatively connectable to the propeller of the vehicle whereby rotation of the crankshaft is translated into activation of the propeller. The crankshaft is operated by a pair of opposing cranks each having a crank rod and a crank handle. One end of each crank rod is connected to the crankshaft and the other end of each crank rod is connected to the crank handle so that turning the crank handles rotates the crankshaft. The assembly includes a pair of grips, one drivingly connected to each crank handle so the grips turn with the crank handles. Each grip is rotatably supported relative to the crank rod so that as the crank rod is turned the grip remains rearward of the crank handle. Each grip is operatively connected to the steering mechanism of the vehicle and pivotally connected to the crank handle so that pivotation of the grip relative to the crank handle operates the steering mechanism. In this way, the vehicle can be steered and driven simultaneously by operation of at least one of the grips.

In another aspect, the invention is directed to a manual operating assembly for a vehicle having a propeller and a steering mechanism. In this aspect, the manual operating assembly comprises a pair of opposing drive members operatively connectable to the propeller of the vehicle whereby opposing motion of the drive members is translated into movement of the propeller. Each drive member has a handle portion. The assembly includes a pair of elongated grips, one grip drivingly connected to the handle portion of each drive member so that the grip and the handle portion move together. The grips are pivotally connected to the handle portions and operatively connectable to the steering mechanism so that pivotation of the grip relative to the handle portion operates the steering mechanism. In this way, the vehicle can be steered and driven simultaneously by operation of at least one of the grips. In addition, each grip pivots substantially about its central transverse axis.

In yet another aspect, the present invention is directed to a vehicle comprising a frame and at least one propeller operatively mounted on the frame. The vehicle includes a steering system supported on the frame and a manual operating assembly. The operating assembly comprises a crankshaft rotatably supported on the frame and operatively connected to the propeller whereby rotation of the crankshaft is translated into activation of the propeller. The assembly includes a pair of opposing cranks each having a crank rod and a crank handle, one end of the crank rod being connected to the crankshaft and the other end of the rod connected to the crank handle so that turning the crank handles rotates the crankshaft. Also included is a pair of grips one drivingly connected to each crank handle, whereby the crank handle moves with the grip. Each grip is rotatably supported relative to the crank rod so that as the crank rod is turned the grip remains rearward of the crank handle. Each grip is operatively connected to the steering system and is pivotally connected to the crank handle so that pivotation of the grip relative to the crank handle steers the vehicle. In this way, the vehicle can be steered and driven simultaneously by operating at least one of the grips.

In still another aspect, the present invention is directed to a vehicle comprising a frame, a propeller operatively mounted on the frame and a manual operating assembly. The assembly comprises a pair of opposing drive members operatively connected to the propeller whereby opposing motion of the drive members is translated into activation of the propeller. Each drive member has a handle portion. Included in the assembly are a pair of elongated grips, one grip drivingly connected to the handle portion of each drive member so that the handle portion and the grip move together. The grip is pivotally connected to the handle portion and operatively connected to the steering system so that pivotation of the grip relative to the handle portion steers the vehicle. In this way, the vehicle can be steered and driven simultaneously by operation of at least one of the grips. In addition, each grip pivots substantially about its central transverse axis.

BRIEF DESCRIPTION OF THE DRAWINGS

FIG. 4 is an elevational view of the timing assembly on the hand crank.

FIG. 5 is a plan view of the crank handle and grip of the operating assembly.

DETAILED DESCRIPTION OF THE PREFERRED EMBODIMENT

Figure 1:
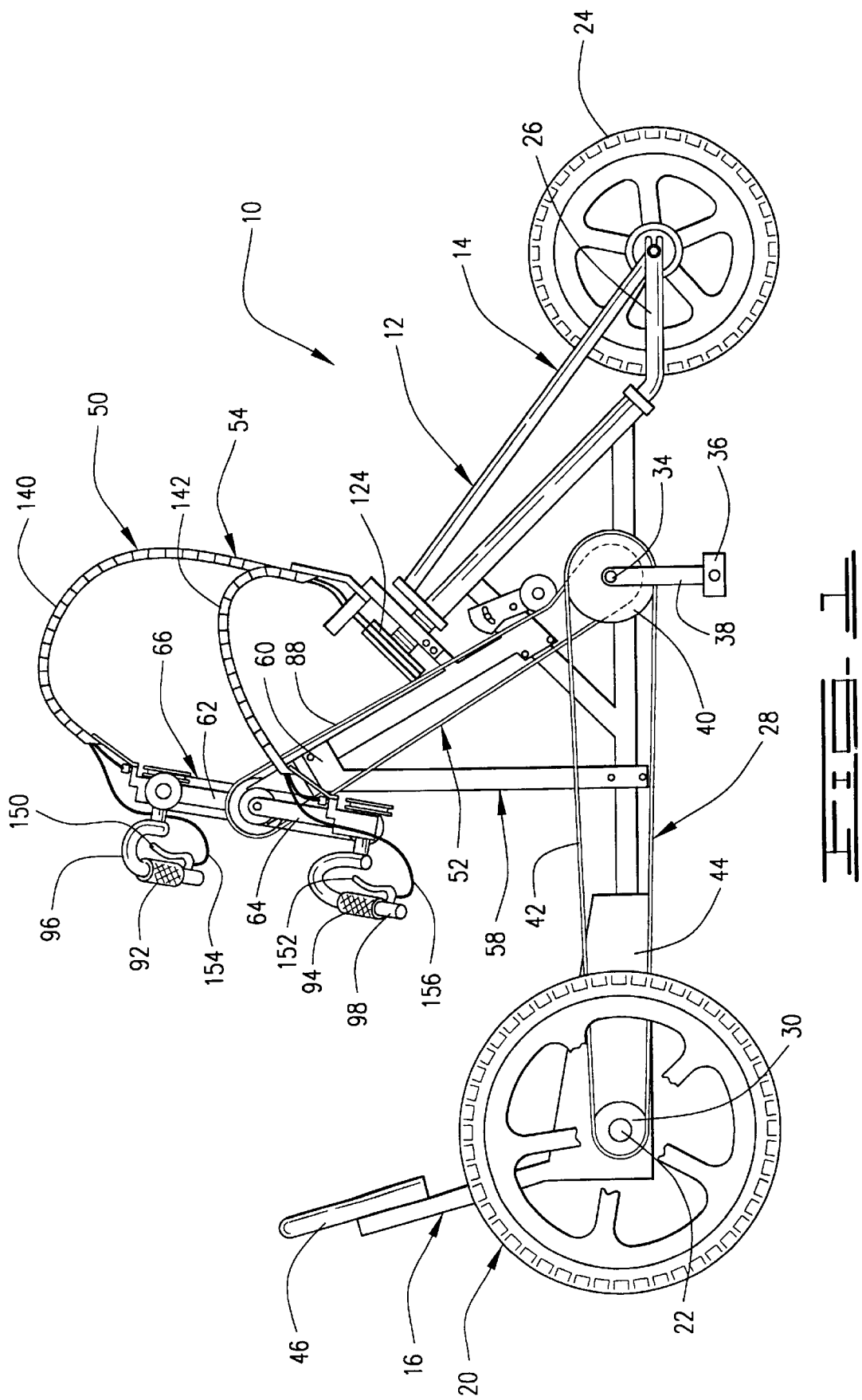
FIG. 1 is a side elevational view of a three-wheeled cycle equipped with a manual operating assembly in accordance with the present invention.

Turning now to the drawings in general and to FIG. 1 in particular, there is shown therein a vehicle constructed in accordance with the present invention and designated generally by the reference numeral. In the embodiment illustrated herein, the vehicle is a three-wheeled cycle 10. However, it should be understood that that invention is not limited to three-wheeled cycles, or even to wheeled vehicles. Rather, the operating assembly of this invention is applicable to any vehicle with a propeller, as that term is defined herein.

The cycle 10 comprises a frame 12 for supporting the operating assembly and the operator. The size and structure of the frame 12 will vary widely depending on the nature of the vehicle.

The cycle 10 comprises a propeller operatively mounted to the frame 12 to propel the cycle. As used herein, "propeller" is used to denote virtually any device adapted to propel a vehicle through a fluid, such as air or water in the case of an aircraft or water craft, or over a surface, such as a land vehicle. Thus, propeller includes but is not limited to wheels and rollers, which typically are used on land vehicles, as well as paddles and radiating blades which typically are used in air and water crafts.

As shown in FIG. 1, the frame 12 of the cycle 10 has a front 14 and a rear 16. A propeller, in the form of a pair of parallel rear wheels 20, is operatively mounted to the frame 12. More specifically, the wheels 20 (only one of which is seen in the drawings) are supported on an axle 22 that is rotatably supported on the rear 16 of the frame 12.

The cycle 10 includes a front guidance wheel 24 rotatably supported on a yoke 26. The yoke 26 is pivotally supported on the frame 12 so that pivotal movement of the yoke relative to the frame will control the direction of travel of the cycle 10. The pivotal movement of the yoke 26 is controlled by a steering assembly to be described hereafter.

In the embodiment shown the cycle 10 includes a primary drive assembly 28 comprising a conventional pedal-operated crank. More specifically, the cycle 10 includes a rear or drive wheel sprocket wheel 30 fixed to the axle 22. A crankshaft 34 is rotatably supported on the frame 12. The crankshaft 34 is driven by a pair of pedals 36 (only one of which is seen in the drawings) extending from the crank rods 38 in opposite directions. A foot crank sprocket wheel 40 is non-rotatably supported on the crankshaft 34, and a chain 42 drivingly connects the sprocket wheels 30 and 40. Thus, turning of the crank pedals 36 drives the rear wheels 20 to propel the cycle 10.

In the present embodiment, the operator is seated. Thus, a seat 44 is attached to the frame 12. More specifically, in this embodiment, the operator is positioned with his or her legs extended forwardly. Thus, it is desirable also to provide a back support 46 on the frame 12. It will be appreciated that in some instances it will be advantageous to make the frame 12 adjustable so that operators of substantially different heights can ride and operate the cycle 10 comfortably.

With continued reference to FIG. 1, the cycle 10 further comprises a manual operating assembly 50. As used herein, "manual" refers to an assembly that can be operated by one or both hands of the operator of the vehicle. The manual operating assembly 50 comprises a drive system 52 and a steering system 54. In the embodiment illustrated herein, drive system 52 of the manual operating assembly 50 is an auxiliary drive assembly, the primary drive system of the cycle 10 being the pedal crank assembly 28. It should be understood, however, that while the manual drive system 52 in the present embodiment is auxiliary to the pedal crank drive assembly 28 in the cycle 10, the present invention is not so limited. Rather, in many instances, the manual drive system 52 of this invention will be the primary or only drive system on a vehicle.

It should be noted that the manual operating assembly 50 can be incorporated into the original construction of new vehicles or it can be separately manufactured and retro fitted to existing vehicles. In the embodiment shown herein, the assembly 50 has been retro fitted to an existing cycle. To that end, the assembly 50 preferably comprises a support frame 58 which is bolted on to the frame 12 of the cycle 10. The support frame 58 includes a bracket 60 or other structure that supports the drive members yet to be described.

As shown in FIG. 1, the operating assembly 50 comprises a pair of opposing drive members operatively connectable to the wheels 20 of the cycle 10 so that operation of the drive members is translated into movement of the wheels. Preferably, the drive members take the form of oppositely extending cranks 62 and 64 forming a crank assembly 66.

As described herein, the term "opposing drive members" refers to drive members that are operated by opposing forces. For example, in the case of a crank type drive as illustrated herein, the crank rods are disposed at 180 degrees to each other. In this way, the operator's hands are always pushing and pulling in opposite directions. Similarly, in the case of lever type drive members, one lever is pushed forward and the other is pulled rearward at the same time.

Another drive mechanism which can be used is a conventional handle bar member pivotally mounted with a connecting rod linking the handle bar to the foot crank of the cycle so that as the handle bar is swiveled the connecting rod rotates the foot crank. Again, in this case one side of the handle bar is pushed forward while the other is pulled rearward.

The use of oppositely moving drive members is advantageous, as the push-pull movement used to operate such drive members tends to maintain the operator in a more stable and comfortable position. This is especially true where the operator is seated in the vehicle. Where both drive members are symmetrically operated, the pushing portion of the drive cycle tends to move the operator forward out of the seat. For example, in the case of symmetrical cranks or levers, where both members are turned or pushed forward simultaneously, the operator's position on the seat is less stable. However, where the drive members are oppositely oriented so that the operator is pushing with one hand and pulling with the other hand, the operator's position in the seat remains secure.

Figure 2:
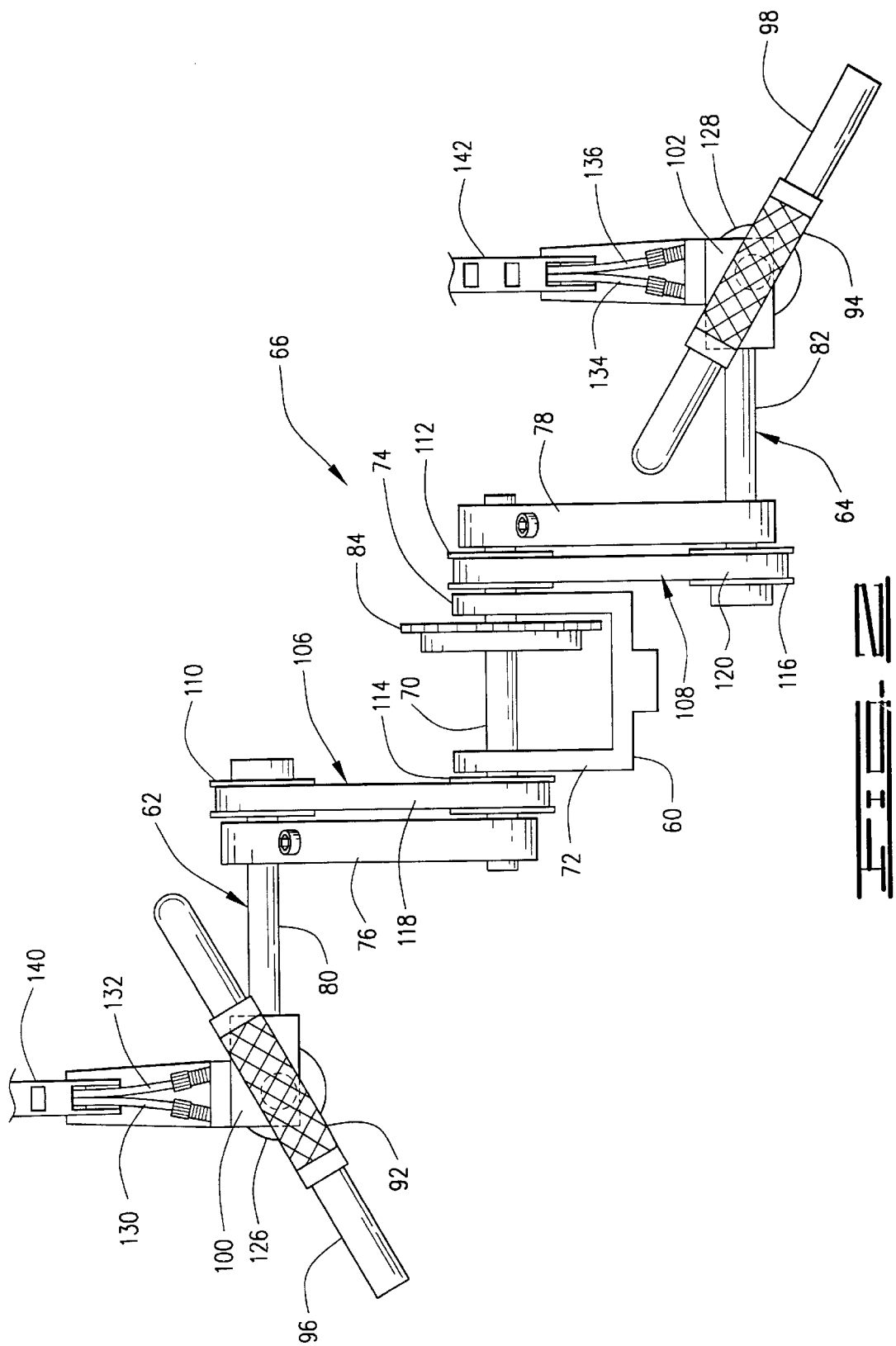
FIG. 2 is an enlarged, elevational view of the operating assembly.

Turning to FIG. 2, the preferred crank assembly 66 will be described in more detail. A crankshaft 70 is rotatably supported in arms 72 and 74 of the bracket 60 by bearings (not shown). Connecting rods 76 and 78 are non-rotatably attached at one end to the ends of the crankshaft 70. The other ends of the rods 76 and 78 are rotatably connected to the handles 80 and 82, so that each handle can rotate about its longitudinal axis as it orbits the crankshaft 70. A suitable bearing assembly (not shown) is provided at these connections for smooth operation.

Figure 3:
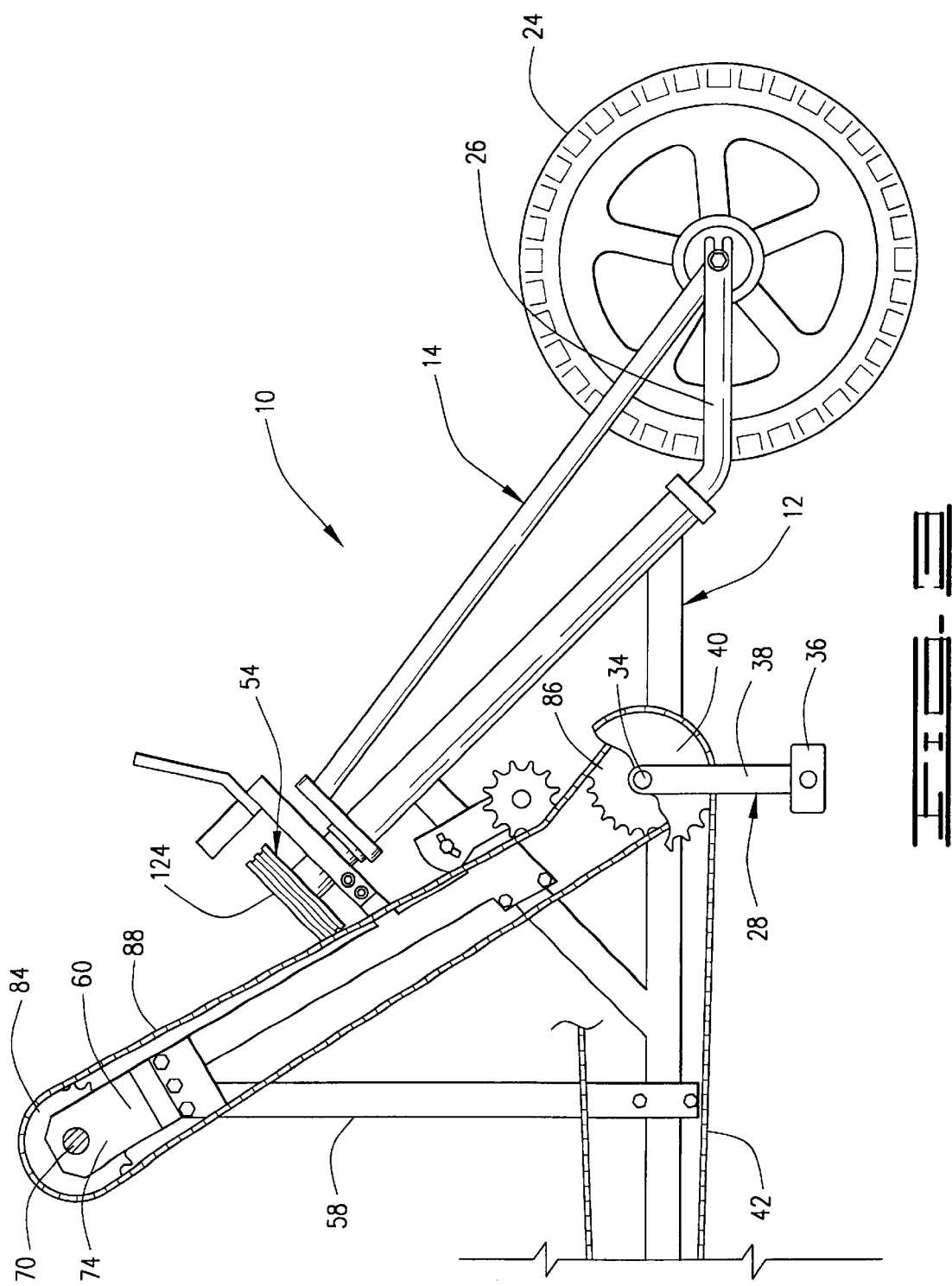
FIG. 3 is a fragmented, partially cutaway, side elevational view of the cycle of FIG. 1, illustrating how the manual operating system is merged with the pedal crank system.

A manual crank sprocket wheel 84 is non-rotatably supported on the crankshaft 70. As shown in FIG. 3, an intermediate sprocket wheel 86 is non-rotatably supported on the crankshaft 34 of the pedal crank assembly 28, and a chain 88 drivingly connects the intermediate sprocket wheel 86 and the manual crank sprocket wheel 84. In this way, operation of the manual crank assembly 66 will also drive the pedal crank assembly 28, which in turn drives the wheels 20 to propel the cycle 10.

Now it will be appreciated that the sprocket wheels 84 and 86 preferably will be the same size so that the handles 80 and 82 can be synchronized with the pedals 36. In this way, the crank handles and pedals can be timed in such a way that the operator's hands will not interfere with the operator's legs.

Referring again to FIG. 2, grips 92 and 94 are drivingly connected to each of the crank handles 80 and 82 so that the crank handles move with the grips. To this end, the grips 92 and 94 are supported on grip support members 96 and 98. The grip support members 96 and 98 are non-rotatably connected by means of clamps 100 and 102 to the handles 80 and 82. Thus, the operator can turn the crank handles 80 and 82 and thus the crank rods 76 and 78 by moving the grips 92 and 94.

Because of the rotatable connection between the crank handles 80 and 82 and the crank rods 76 and 78, the grips 92 and 94 can be maintained in a rearward position relative to the operator of the vehicle. However, this rotatable connection requires the operator to maintain the orbital position of the grips 92 and 94 and the handles 80 and 82, as well as pushing and pulling the crank rods 76 and 78 around the shaft 70. This requires significant strength and coordination on the part of the operator. Operation of the manual crank assembly 66 is greatly facilitated by providing grip orientation control assemblies 106 and 108 for each crank handle 80 and 82 for controlling the rotation of the handle relative to its orbital position for maintaining the orientation of the grips 92 and 94 relative to the operator.

With continued reference to FIG. 2 and now also to FIG. 4, the preferred grip orientation control assemblies 106 and 108 each comprises a stationary member, such as the pulley wheels 110 and 112, which are non-rotatably connected to the bracket 60. Each of the assemblies 106 and 108 also has an orbiting member, such as the orbiting pulleys 114 and 116, which are non-rotatably attached to the ends of the crank handles 80 and 82. Transfer members, such as the belts 118 and 120, are provided for connecting the pulleys and synchronizing the orbit of each orbiting pulley 114 and 116 relative to the corresponding stationary pulley 110 and 112. The belts 118 and 120 preferably are endless belts that are non-slippingly engaged with the pulley wheels as by teeth or sprockets. In this way, the rotation of the handles 80 and 82 is controlled and synchronized with the turning of the rods 76 and 78.

As most vehicles require steering, it is advantageous to integrate the steering function with the drive members. The steering mechanism will, of course, vary depending on the nature of the vehicle. In the case of a boat or aircraft, the steering mechanism may be a rudder.

As explained previously, in the cycle 10 illustrated herein, steering is accomplished by means of turning the yoke 26 supporting the front guidance wheel 24. Thus, the grips 92 and 94 preferably are operatively connected to the yoke 26 so the cycle 10 can be steered and driven simultaneously by operation of at least one of the grips.

As seen best in FIG. 3, a primary pulley, such as the gooseneck pulley 124, is non-rotatably connected to the yoke 26. Secondary pulleys 126 and 128, shown in FIG. 2, are connected to the grips 92 and 94. Cables 130 and 132 are connected to the pulley 126, and cables 134 and 136 are connected to the pulley 128. The ends of all the cables 130, 132, 134 and 136 are connected to the gooseneck pulley 124, so that rotation of either of the secondary pulleys 126 or 128 will rotate the gooseneck pulley 124 and thus turn the wheel 24. While the present embodiment includes two oppositely connected cables for each pulley 126 and 130, which pull alternately with opposing rotation of the pulley, it will be understood that a single bi-directional cable could be substituted. In most instances, it will be desirable to enclose the cables 130, 132, 134 and 136 in flexible tracks 140 and 142, which will support and protect the cables.

The operation of the cables 130, 132, 134 and 136 by the grips 92 and 94 is depicted in FIG. 5, to which attention now is directed. As the grips and crank handles are similarly formed only the right grip 94 and handle 82 will be described in detail. Preferably, the grip 94 is elongated and sized to fit comfortably in the human hand. The grip 94 may be formed of a resilient and absorbent material for a comfortable and secure gripping action. The grip 94 preferably is supported for pivotation substantially about its central transverse axis indicated at "X" in FIG. 5. This allows pivotal operation of the grip 94 to be accomplished by minimal wrist action. That is, the grip 94 can be pivoted by simply twisting the wrist; there is no need for larger movements of the lower and upper arm. This requires less strength and coordination when combined with the rotary movement of the crank handle 82.

In the preferred practice of the invention, the grip support member 98 is a hook or U-shaped tubular structure having a short leg 144 and a parallel long leg 146. The grip 94 is supported on the long leg 146. A stem 148 extends perpendicularly from the short leg along the axis "X" so as to intersect the crank handle 82 and so as to be generally aligned with the wrist of the operator when the operator's hand is holding the grip 94. The stem 148 extends through the bracket 102, and is rotatably supported therein and non-rotatably fixed to the pulley 128. In this way, the grip 94 is pivotally connected to the crank handle 82 so that pivotation of the grip relative to the handle operates the secondary pulley 128, the gooseneck pulley 124, the yoke 26 and in turn the front guidance wheel 24.

In most instances, the vehicle will have a braking mechanism and frequently this mechanism will be hand-operable. The manual operating assembly 50 of the present invention can be adapted easily to incorporate a brake actuator. As shown in FIG. 1, brake levers 150 and 152 can be supported adjacent each grip 92 and 94. The brake levers 150 and 152 are connected by cables 154 and 156 to brake mechanisms on the rear and front wheels 20 and 24, respectively. As the cable and brake mechanisms are well-known, these are not shown or described in detail herein.

As best seen in FIG. 5, the brake lever 152 can be attached conveniently to the open end 158 of the long leg 146 of the grip support member 98 so that the lever is adjacent to the grip 94. In this way, the brake lever 152 can be operated by merely extending the fingers to enclose the lever and without removing the operator's hand from the grip. The brake cables 154 and 156 can be included in the tracks 140 and 142 with the steering cables 130, 132, 134 and 136.

While a preferred embodiment of the present invention has been shown and described, the scope of the invention should not be so limited. For example, although the preferred drive members of the present invention comprise opposing cranks, it should be understood that other types of drive members might be substituted for the crank mechanism. Levers and swiveling handlebars can be utilized. These and other types of mechanisms can be operatively connected to the propellers, such as wheels, of various types of vehicles. Cables have been shown as the preferred mechanism for connecting the steering and braking mechanisms of the vehicle to the grips. However, other connecting mechanisms could be used instead of cables, such as levers, cams, connecting rods, or telescoping members. The preferred grip orientation control assembly is a pair of pulley wheels synchronized by a timing belt, but a series of three or more gears could be used in place of this pulley system. Still further, cycles and other vehicles typically are provided with gears for different speeds of travel. Although no such gears are illustrated herein, these could be installed in the cycle shown in a known manner.

Now it will be appreciated that the present invention provides a compact and easily operable hand-controlled operating system, which consolidates the steering and drive functions. A grip is pivotally attached to the handle of the drive member so that a simple twist of the wrist, without any large arm movements, controls the steering mechanism of the vehicle. The same grip is drivingly attached to the drive member, preferably a crank, for driving the vehicle. Thus, the present invention allows the operator to turn and drive the vehicle, as well as use the brake, all with one hand on a single grip member. This manual operating assembly is particularly suitable for cycles and wheelchairs, but can be readily adapted for many other vehicles.

Changes can be made in the combination and arrangement of the various parts and elements described herein without departing from the spirit and scope of the invention as defined in the following claims.

What is claimed is:

1. A manual operating assembly for a vehicle having a propeller and a steering mechanism, the manual operating assembly comprising:

a crankshaft rotatably supportable on the vehicle and operatively connectable to the propeller of the vehicle whereby rotation of the crankshaft is translated into activation of the propeller;

a pair of opposing cranks each having a crank rod and a crank handle, wherein one end of each crank rod is connected to the crankshaft and the other end of each crank rod is connected to the crank handle so that turning the crank handles rotates the crankshaft; and a pair of grips, one drivingly connected to each crank handle so the grips turn with the crank handles, wherein each grip is rotatably supported relative to the crank rod so that as the crank rod is turned the grip remains rearward of the crank handle, wherein each grip is operatively connected to the steering mechanism of the vehicle and pivotally connected to the crank handle so that pivotation of the grip relative to the crank handle operates the steering mechanism, whereby the vehicle can be steered and driven simultaneously by operation of at least one of the grips.

2. The operating assembly of claim 1 wherein each of the crank handles is rotatably connected to the end of the crank rod so that the crank handle can rotate about its longitudinal axis as it orbits the crankshaft, wherein the grips are non-rotatably attached to the crank handles, and wherein the operating assembly further comprises means for controlling the rotation of the handle relative to its orbital position for maintaining the orientation of the grip relative to the operator of the vehicle.

3. The operating assembly of claim 2 further comprising a bracket in which the crankshaft is rotatably supported, and wherein the grip orientation control means comprises a stationary member non-rotatably connected to the bracket, an orbiting member non-rotatably attached to the crank handle, and a transfer member therebetween for controlling the rotation of the handle relative to the orbital position of the handle.

4. The operating assembly of claim 3 wherein the stationary members and the orbiting members are pulley wheels and wherein each transfer member is an endless belt non-slippingly engaged with pulley wheels.

5. The operating assembly of claim 1 wherein the vehicle has a braking system and wherein the operating assembly further comprises a brake actuator supported adjacent the grip and means for operatively connecting the brake actuator to the braking system on the vehicle.

6. The operating assembly of claim 1 wherein the vehicle is a cycle comprising a frame, a yoke pivotally supported on the frame, and a wheel rotatably supported in the yoke, and wherein the operating assembly comprises:

a primary pulley wheel non-rotatably connectable to the yoke;

at least one secondary pulley non-rotatably connected to one of the grips so that pivotation of the grip rotates the secondary pulley;

a cable assembly operatively connecting the secondary pulley to the primary pulley, so that pivotation of the grip turns the yoke to steer the cycle.

7. The operating assembly of claim 6 wherein the cable assembly comprises a pair of oppositely connected pull cables.

8. The operating assembly of claim 7 comprising a secondary pulley for each grip.

9. The operating assembly of claim 8 further comprising a grip support member having a stem, wherein the stem rotatably intersects the crank handle for pivoting the grip relative to the crank handle, and wherein the secondary pulley is non-rotatably fixed to the stem.

10. The operating assembly of claim 1 further comprising a grip support member having a stem, wherein the stem rotatably intersects the crank handle for pivoting the grip relative to the crank handle.

11. The operating assembly of claim 10 wherein the grip support member is U-shaped.

12. The operating assembly of claim 1 further comprising a support frame including a bracket for rotatably supporting the crankshaft.

13. The operating assembly of claim 1 wherein the propeller is driven by a pedal-operated crank comprising a crankshaft, wherein the operating assembly further comprises a manual crank sprocket wheel non-rotatably supportable on the crank shaft of the operating assembly, an intermediate sprocket wheel non-rotatably supported on the crankshaft of the pedal-operated crank, and a chain for drivingly connecting the intermediate sprocket wheel of the operating assembly to the manual crank sprocket wheel on the crankshaft of the operating assembly, whereby operation of the operating assembly crank drives the propeller of the vehicle.

14. The operating assembly of claim 1 wherein the grip is elongated and is supported for pivotation substantially about its central transverse axis.

15. A manual operating assembly for a vehicle having a propeller and a steering mechanism, the manual operating assembly comprising:

a pair of opposing drive members operatively connectable to the propeller of the vehicle whereby opposing motion of the drive members is translated into movement of the propeller, wherein each drive member has a handle portion; and a pair of elongated grips, one grip drivingly connected to the handle portion of each drive member so that the grip and the handle portion move together, wherein the grips are pivotally connected to the handle portions and operatively connectable to the steering mechanism so that pivotation of the grip relative to the handle portion operates the steering mechanism, whereby the vehicle can be steered and driven simultaneously by operation of at least one of the grips, and wherein each grip pivots substantially about its central transverse axis.

16. The operating assembly of claim 15 wherein the vehicle has a braking system and wherein the operating assembly further comprises a brake actuator supported adjacent the grip and means for operatively connecting the brake actuator to the braking system on the vehicle.

17. The operating assembly of claim 15 wherein the vehicle is a cycle comprising a frame, a yoke pivotally supported on the frame, and a wheel rotatably supported in the yoke, and wherein the operating assembly comprises:

a primary pulley wheel non-rotatably connectable to the yoke;

at least one secondary pulley non-rotatably connected to one of the grips so that pivotation of the grip rotates the secondary pulley;

a cable assembly operatively connecting the secondary pulley to the primary pulley, so that pivotation of the grip turns the yoke to steer the cycle.

18. The operating assembly of claim 17 wherein the cable assembly comprises a pair of oppositely connected pull cables.

19. The operating assembly of claim 18 comprising a secondary pulley for each grip.

20. The operating assembly of claim 19 further comprising a grip support member having a stem, wherein the stem rotatably intersects the handle portion of the drive member for pivoting the grip relative to the handle portion, and wherein the secondary pulley is non-rotatably fixed to the stem.

21. The operating assembly of claim 15 further comprising a grip support member having a stem, wherein the stem rotatably intersects the handle portion of the drive member for pivoting the grip relative to the handle portion.

22. The operating assembly of claim 21 wherein the grip support member is U-shaped.

23. The operating assembly of claim 15 further comprising a support frame for attaching the drive members to the vehicle.

24. A vehicle comprising:

a frame;

at least one propeller operatively mounted on the frame;

a steering system supported on the frame;

a manual operating assembly comprising:

a crankshaft rotatably supported on the frame and operatively connected to the propeller whereby rotation of the crankshaft is translated into activation of the propeller;

a pair of opposing cranks each having a crank rod and a crank handle, one end of the crank rod being connected to the crankshaft and the other end of the rod connected to the crank handle so that turning the crank handles rotates the crankshaft; and a pair of grips one drivingly connected to each crank handle, whereby the crank handle moves with the grip, wherein each grip is rotatably supported relative to the crank rod so that as the crank rod is turned the grip remains rearward of the crank handle, wherein each grip is operatively connected to the steering system and is pivotally connected to the crank handle so that pivotation of the grip relative to the crank handle steers the wheel, whereby the vehicle can be steered and driven simultaneously by operating at least one of the grips.

25. The vehicle of claim 24 wherein each of the crank handles is rotatably connected to the end of the crank rod so that the crank handle can rotate about its longitudinal axis as it orbits the crankshaft, wherein the grips are non-rotatably attached to the crank handles, and wherein the operating assembly further comprises means for controlling the rotation of the handle relative to its orbital position for maintaining the orientation of the grip relative to the operator of the vehicle.

26. The vehicle of claim 25 further comprising a bracket in which the crankshaft is rotatably supported, and wherein the grip orientation control means comprises a stationary member non-rotatably connected to the bracket, an orbiting member non-rotatably attached to the crank handle, and a transfer member therebetween for controlling the rotation of the handle relative to the orbital position of the handle.

27. The vehicle of claim 26 wherein the stationary members and the orbiting members are pulley wheels and wherein each transfer member is an endless belt non-slippingly engaged with pulley wheels.

28. The vehicle of claim 24 further comprising a braking system and wherein the operating assembly comprises a brake actuator supported adjacent the grip and means for operatively connecting the brake actuator to the braking system on the vehicle.

29. The vehicle of claim 24 further comprising:

a frame;

a yoke pivotally supported on the frame; and a wheel rotatably supported in the yoke;

wherein the operating assembly further comprises:

a primary pulley wheel non-rotatably connectable to the yoke;

at least one secondary pulley non-rotatably connected to one of the grips so that pivotation of the grip rotates the secondary pulley; and a cable assembly operatively connecting the secondary pulley to the primary pulley, so that pivotation of the grip turns the yoke to steer the cycle.

30. The vehicle of claim 29 wherein the cable assembly comprises a pair of oppositely connected pull cables.

31. The vehicle of claim 30 further comprising a secondary pulley for each grip.

32. The vehicle of claim 31 wherein the operating assembly further comprises a grip support member having a stem, wherein the stem rotatably intersects the crank handle for pivoting the grip relative to the crank handle, and wherein the secondary pulley is non rotatably fixed to the stem.

33. The vehicle of claim 24 wherein the operating assembly further comprises a grip support member having a stem, wherein the stem rotatably intersects the crank handle for pivoting the grip relative to the crank handle.

34. The vehicle of claim 33 wherein the grip support member is U-shaped.

35. The vehicle of claim 24 further comprising a support frame including a bracket for rotatably supporting the crankshaft.

36. The vehicle of claim 24 wherein the propeller is driven by a pedal-operated crank comprising a crankshaft, wherein the operating assembly further comprises a manual crank sprocket wheel non-rotatably supportable on the crankshaft of the operating assembly, an intermediate sprocket wheel non-rotatably supported on the crankshaft of the pedal-operated crank, and a chain for drivingly connecting the intermediate sprocket wheel to the manual crank sprocket wheel, whereby operation of the operating assembly crank drives the propeller of the vehicle.

37. The vehicle of claim 24 wherein the grip is elongated and is supported for pivotation substantially about its central transverse axis.

38. The vehicle of claim 24 wherein the propeller is a wheel.

39. The vehicle of claim 24 further comprising:

a frame having a front and a rear;

a axle supported on rear of the frame;

a drive wheel rotatably supported on the axle forming the propeller of the vehicle;

a drive wheel sprocket wheel non-rotatably supported on the axle;

a foot crank comprising;

a crankshaft;

a pair of opposing crank rods;

a pedal extending from each crank rod;

a foot crank sprocket wheel non-rotatably supported on the crankshaft of the foot crank;

a chain drivingly connecting the drive wheel sprocket wheel and the foot crank sprocket wheel;

an intermediate sprocket wheel non-rotatably supported on the crankshaft of the foot crank;

a manual crank sprocket wheel non-rotatably supported on the crankshaft of the operating assembly;

a chain operatively connecting the manual crank sprocket wheel and the intermediate sprocket wheel so that operating of the operating assembly will drive the drive wheels of the vehicle;

wherein the intermediate sprocket wheel, the foot crank sprocket wheel and the manual crank sprocket wheel are substantially the same diameter;

a yoke pivotally supported on the frame;

a guidance wheel rotatably supported in the yoke;

a primary pulley wheel non-rotatably fixed to the yoke;

a secondary pulley wheel non-rotatably fixed to each of the grips;

a cable assembly operatively connecting the primary pulley with each secondary pulley whereby pivotation of the grips steers the guidance wheel.

40. The vehicle of claim 39 comprising a seat supported on the frame.

41. A vehicle comprising:

a frame;

a propeller operatively mounted on the frame;

a manual operating assembly comprising:

a pair of opposing drive members operatively connected to the propeller whereby opposing motion of the drive members is translated into activation of the propeller, and wherein each drive member has a handle portion;

a pair of elongated grips, one grip drivingly connected to the handle portion of each drive member so that the handle portion and the grip move together, wherein the grip is pivotally connected to the handle portion and operatively connected to the steering system so that pivotation of the grip relative to the handle portion steers the vehicle, whereby the vehicle can be steered and driven simultaneously by operation of at least one of the grips, and wherein each grip pivots substantially about its central transverse axis.

42. The vehicle of claim 41 further comprising a braking system and wherein the operating assembly comprises a brake actuator supported adjacent the grip and means for operatively connecting the brake actuator to the braking system on the vehicle.

43. The vehicle of claim 41 further comprising:

a frame;

a yoke pivotally supported on the frame; and a wheel rotatably supported in the yoke;

wherein the operating assembly further comprises:

a primary pulley wheel non-rotatably connectable to the yoke;

at least one secondary pulley non-rotatably connected to one of the grips so that pivotation of the grip rotates the secondary pulley; and a cable assembly operatively connecting the secondary pulley to the primary pulley, so that pivotation of the grip turns the yoke to steer the cycle.

44. The vehicle of claim 43 wherein the cable assembly comprises a pair of oppositely connected pull cables.

45. The vehicle of claim 44 further comprising a secondary pulley for each grip.

46. The vehicle of claim 45 wherein the operating assembly further comprises a grip support member having a stem, wherein the stem rotatably intersects the crank handle for pivoting the grip relative to the crank handle, and wherein the secondary pulley is non-rotatably fixed to the stem.

47. The vehicle of claim 41 wherein the operating assembly further comprises a grip support member having a stem, wherein the stem rotatably intersects the crank handle for pivoting the grip relative to the crank handle.

48. The vehicle of claim 47 wherein the grip support member is U-shaped.

49. The vehicle of claim 41 wherein the propeller is a wheel.

50. The vehicle of claim 41 further comprising:

a frame having a front and a rear;

a axle supported on rear of the frame;

a pair of parallel wheels rotatably supported on the rear axle forming the propeller of the vehicle;

a rear wheel sprocket wheel non-rotatably supported on the axle;

a foot crank comprising;

a crankshaft;

a pair of opposing crank rods;

a pedal extending from each crank rod;

a foot crank sprocket wheel non-rotatably supported on the crankshaft of the foot crank;

a chain drivingly connecting the foot crank sprocket wheel and the rear wheel sprocket wheel;

means for drivingly connecting the drive members of the operating assembly to the foot crank so that the operation of the drive members will drive the rear wheels;

a yoke pivotally supported on the front of the frame;

a guidance wheel rotatably supported in the yoke;

a primary pulley wheel non-rotatably fixed to the yoke;

a secondary pulley wheel non-rotatably fixed to each of the grips; and a cable assembly operatively connecting the primary pulley with each secondary pulley whereby pivotation of the grips steers the guidance wheel.

51. The vehicle of claim 50 comprising a seat supported on the frame.

* * * * *